United States Patent [19]
Gerulski

[11] Patent Number: 6,083,109
[45] Date of Patent: Jul. 4, 2000

[54] UNITIZED SEAL FOR TELESCOPIC SHAFT

[75] Inventor: Mike R. Gerulski, Huntington Woods, Mich.

[73] Assignee: Federal-Mogul World Wide, Inc., Southfield, Mich.

[21] Appl. No.: 09/041,560

[22] Filed: Mar. 12, 1998

[51] Int. Cl.[7] .................................................. F16C 1/26
[52] U.S. Cl. ........................................ 464/175; 277/571
[58] Field of Search ................................. 464/173, 175; 277/353, 551, 571, 634, 635, 636

[56] References Cited

U.S. PATENT DOCUMENTS

| | | |
|---|---|---|
| 1,716,992 | 6/1929 | Varden . |
| 2,134,876 | 11/1938 | Hull et al. . |
| 3,063,266 | 11/1962 | Rabson . |
| 3,356,378 | 12/1967 | Tracy . |
| 3,482,844 | 12/1969 | McKinven ............................ 277/551 |
| 3,510,138 | 5/1970 | Bowen et al. ......................... 277/571 |
| 3,801,111 | 4/1974 | Messenger ............................ 464/173 |
| 4,226,426 | 10/1980 | Messenger ............................ 277/333 |
| 4,325,557 | 4/1982 | Kawamoto ........................ 277/572 X |
| 4,493,676 | 1/1985 | Krude ..................................... 464/175 |
| 4,648,605 | 3/1987 | Marsi . |
| 4,786,272 | 11/1988 | Baker ..................................... 464/175 |
| 4,838,560 | 6/1989 | Heilala . |
| 5,018,750 | 5/1991 | Sparks et al. ......................... 277/353 |
| 5,176,576 | 1/1993 | Moulindt ............................... 277/636 |
| 5,269,536 | 12/1993 | Matsushima et al. ................ 277/551 |
| 5,308,091 | 5/1994 | Mihalcin ............................... 277/636 |
| 5,498,076 | 3/1996 | Krzywdziak . |
| 5,553,866 | 9/1996 | Heinzen ................................. 277/571 |
| 6,003,871 | 12/1999 | Poll ..................................... 277/571 X |

FOREIGN PATENT DOCUMENTS

| | | | |
|---|---|---|---|
| 4205678 | 8/1993 | Germany | ................................. 464/175 |
| 802386 | 10/1958 | United Kingdom . | |

*Primary Examiner*—Terry Lee Melius
*Assistant Examiner*—Greg Binda
*Attorney, Agent, or Firm*—Reising, Ethington, Barnes, Kisselle, Learman & McCulloch, P.C.

[57] ABSTRACT

A unitized seal assembly (10) for a rotary shaft (16) having a main section (20) rotatably supported in a housing (14) and a telescopic end (22) axially extendable relative to the main section (20). The seal assembly (10) comprises a generally rigid annular carrier body (28) supporting a flexible annular sealing member (36) and a inner wear sleeve (44) in running engagement with the sealing member (36). The inner wear sleeve (44) includes an annular mounting skirt (54) which is attached to one end of a pleated elastomeric boot (58). The other end of the boot (58) is attached to the telescopic end (22) of the rotating shaft (16). The boot (58) accommodates extension and retraction of the telescopic end (22) of the shaft (16) as it reciprocates during rotation. Therefore, as the shaft (16) rotates during operation, the boot (58) together with the wear sleeve (44) rotate relative to the sealing member (36) and the outer carrier body (28). As the telescopic end (22) shifts axially due to loads imposed upon it during normal operation, the boot (58) expands and contracts, thereby protecting the spline connection (26). The boot (58) may be packed with grease or the like. The boot (58) also protects the sealing member (36) from rapid wear by isolating it from axial forces as the telescopic end (22) reciprocates.

20 Claims, 3 Drawing Sheets

UNITIZED SEAL FOR TELESCOPIC SHAFT

BACKGROUND OF THE INVENTION

1. Field of the Invention

The subject invention is directed toward a unitized seal for a rotary shaft, and more particularly toward such a seal which prevents leakage and infiltration while an end of the shaft reciprocates axially during rotation.

2. Description of Related Art

In some rotating shaft applications, it is necessary for an exposed end of the shaft to slide axially, i.e., telescopically, relative to the remainder of the shaft. By way of example, a typical prior art differential includes a pinion shaft having a telescopic exposed end which attaches to the rear universal joint of a drive shaft. The telescopic pinion shaft is supported in the differential housing by a pair of roller bearings which must be continuously bathed in lubricating oil contained within the differential housing. A shaft seal is disposed between the pinion shaft and the housing to prevent escape of the lubricating oil and prevent foreign matter infiltration.

According to the prior art, various shaft seal configurations have been proposed to accommodate the axial sliding movement of a telescopic rotary shaft. One common approach has been to position the seal so that it does not contact the telescopic end of the shaft. However this leaves the sliding connection (usually a spline) exposed to the elements. The unprotected sliding joint is thus prone to corrosion and contamination.

Another approach has been to machine a seal running surface on the telescopic end of the shaft, against which the primary sealing surface of the flexible annular sealing member can run. However, this approach also has certain undesirable characteristics. For example, it requires precision machining over a length of the telescopic end of the shaft, and in some cases also increases the length of the telescopic end of the shaft.

Furthermore, the combined rotary and axial forces imposed on the primary sealing surface of the flexible annular sealing member lead to rapid wear.

SUMMARY OF THE INVENTION

According to the subject invention, a unitized seal assembly for a telescopic rotary shaft comprises a generally rigid annular carrier body defining therein a central axis. A flexible annular sealing member is supported concentrically on the carrier body and presents a radially inwardly facing primary sealing surface. A generally rigid annular inner wear sleeve is provided and has a running surface in engagement with the primary sealing surface of the sealing member.

The invention is characterized by an elastomeric boot having fixed and protractile ends axially spaced and longitudinally relatively extensible from one another. The fixed end is coupled to the wear sleeve and the protractile end extends flexibly therefrom for attachment to the telescopic end of a rotating shaft. In this manner, the sliding (i.e., spline) connection is enclosed within the boot, thereby protecting the sliding connection from corrosion. The boot protects the flexible annular sealing member from rapid wear by isolating the sealing member from axial forces. Furthermore, the elastomeric boot provides a region into which grease or other lubricant can be packed to further reduce the likelihood of corrosion in the sliding connection. Also, the inner wear sleeve establishes the seal running surface thereby eliminating the need to machine a seal running surface on the telescopic end of the shaft.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENTS

Figure 1:
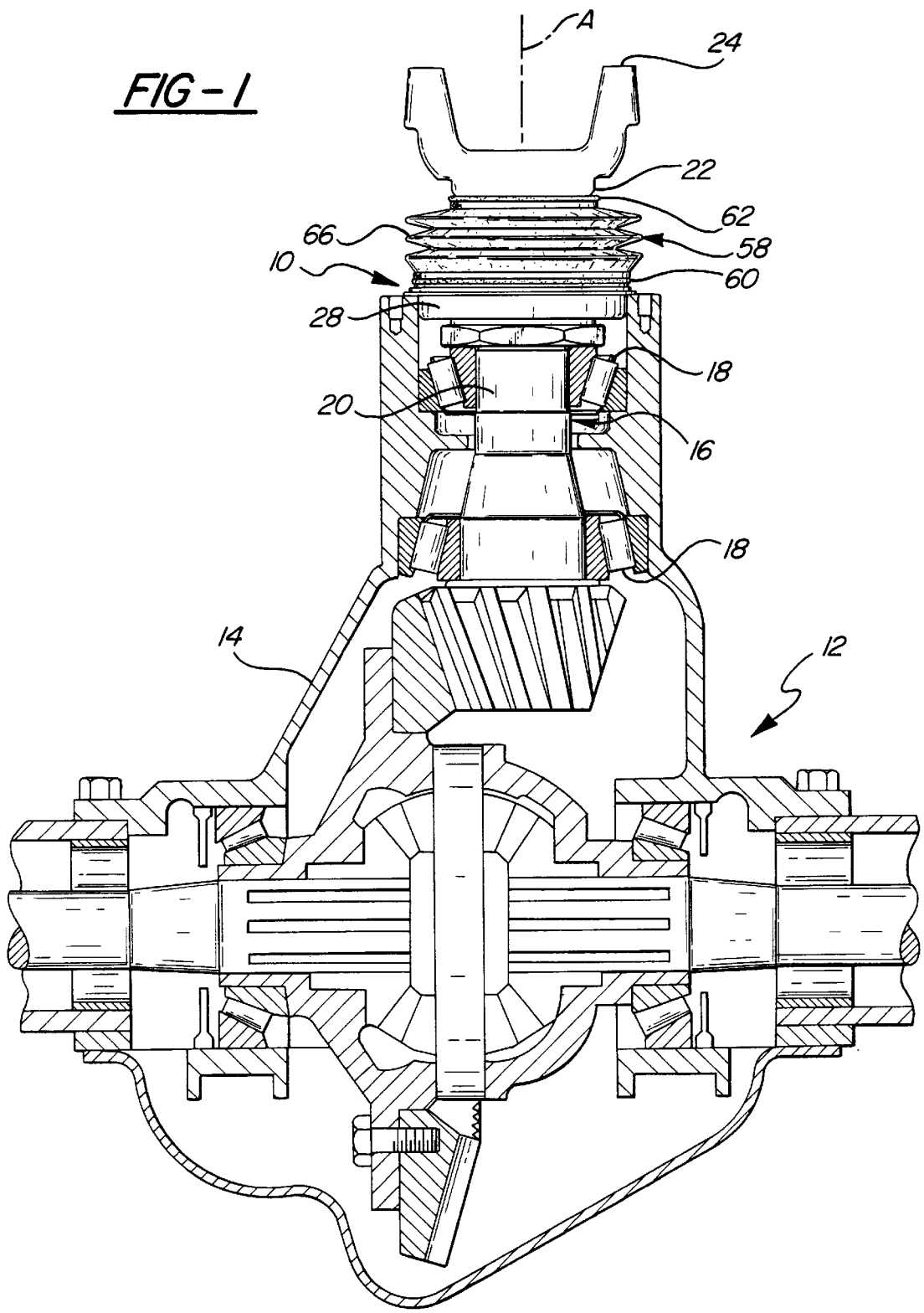
FIG. 1 is a cross-sectional view of a vehicular differential showing the subject unitized shaft seal assembly positioned therein about a telescopic pinion shaft.

Referring to the Figures, wherein like numerals indicate like or corresponding parts throughout the several views, a unitized seal assembly for a telescopic rotary shaft is generally shown at 10. As an illustrative example of one sealing application with a telescopic rotary shaft, the seal assembly 10 is shown in FIG. 1 mounted in a vehicular differential, generally indicated at 12. However, those skilled in the art will readily appreciate other sealing applications for a telescopic rotary shaft, e.g., in the rear extension of a rear wheel drive transmission or the like.

Figure 2:
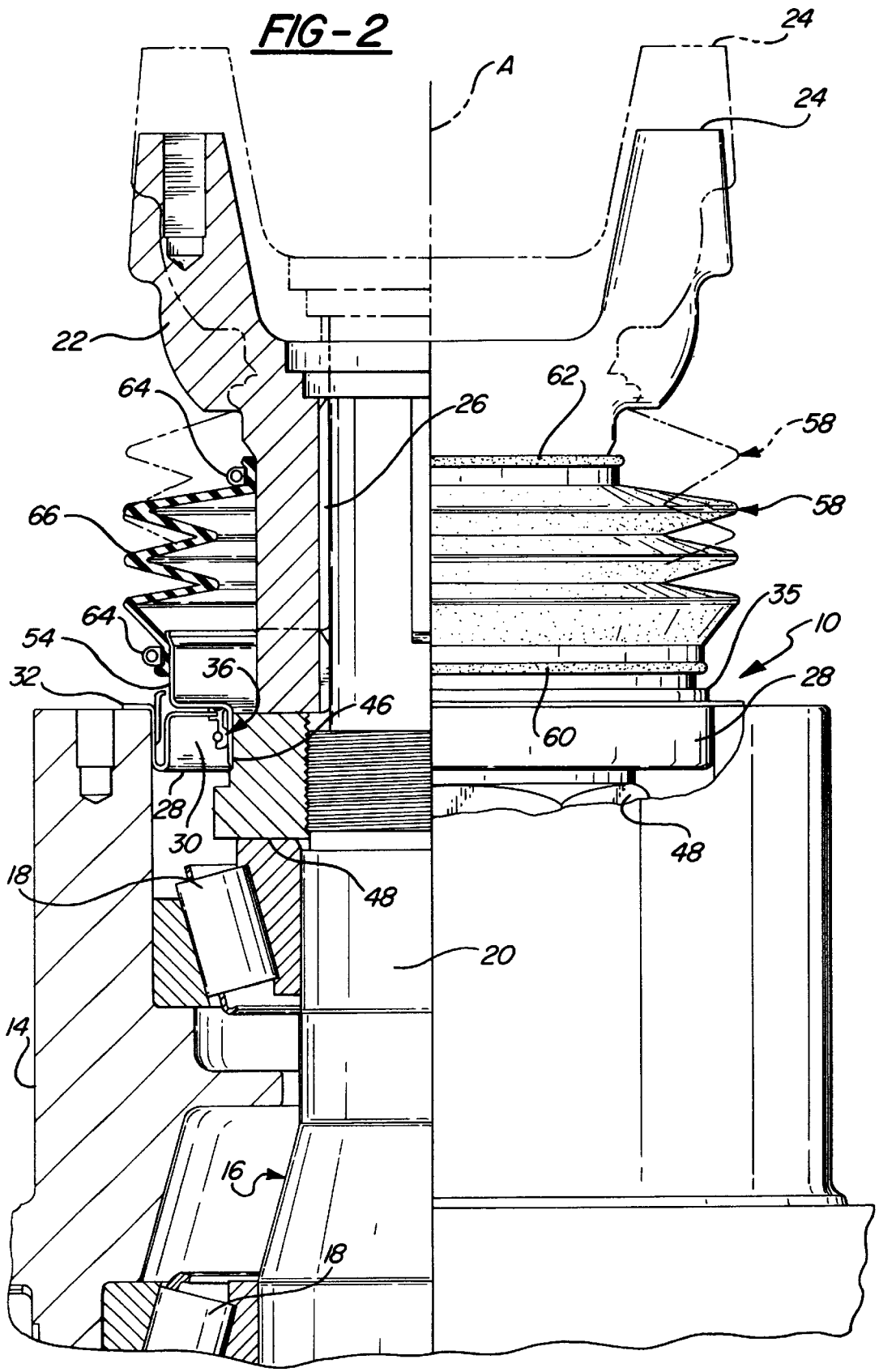
FIG. 2 is a quarter-sectional view showing the unitized shaft seal assembly mounted in the housing about the telescopic pinion shaft.

The differential 12 includes a protective housing 14. A pinion shaft, generally indicated at 16, is rotatably disposed about a longitudinal axis A within the housing 14 by roller bearings 18. However, those skilled in the art will appreciate that sometimes plain bearings and/or bushings may be used instead of the roller bearings 18. A lubricating fluid (not shown) is contained within the housing 14 and bathes the bearing 18 during operation. The shaft 16 is composed of a main section 20, rotatably supported in the housing 14, and a telescopic section 22 axially extendable relative to the main section 20 and the housing 14. As best shown in FIG. 2, the telescopic section 22 comprises a yoke 24 for connecting to a universal joint (not shown), and internal splines for axially slidably connecting to male splines 26 on the main section 20. In this manner, during operation the telescopic section 22 is free to slide axially relative to the main section 20, such as when the vehicle is accelerating/decelerating or traversing uneven terrain, or when the vehicle is heavily loaded.

Figure 3:
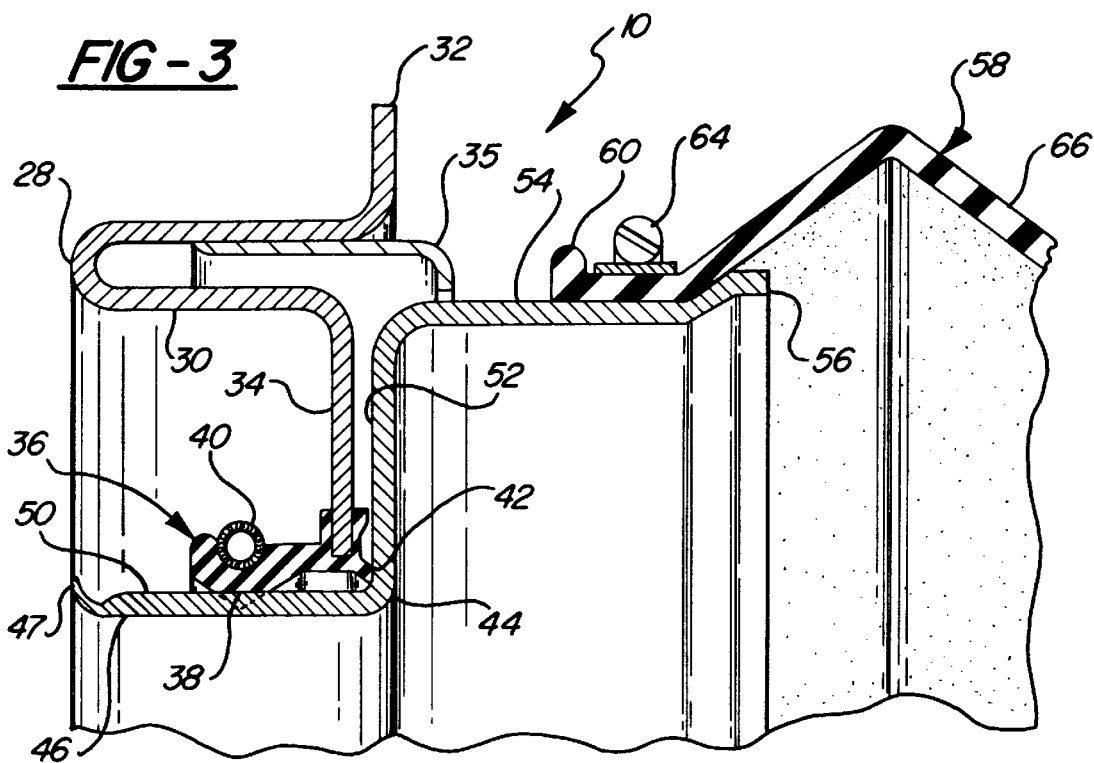
FIG. 3 is a fragmentary sectional view of the unitized shaft seal assembly.
Figure 4:
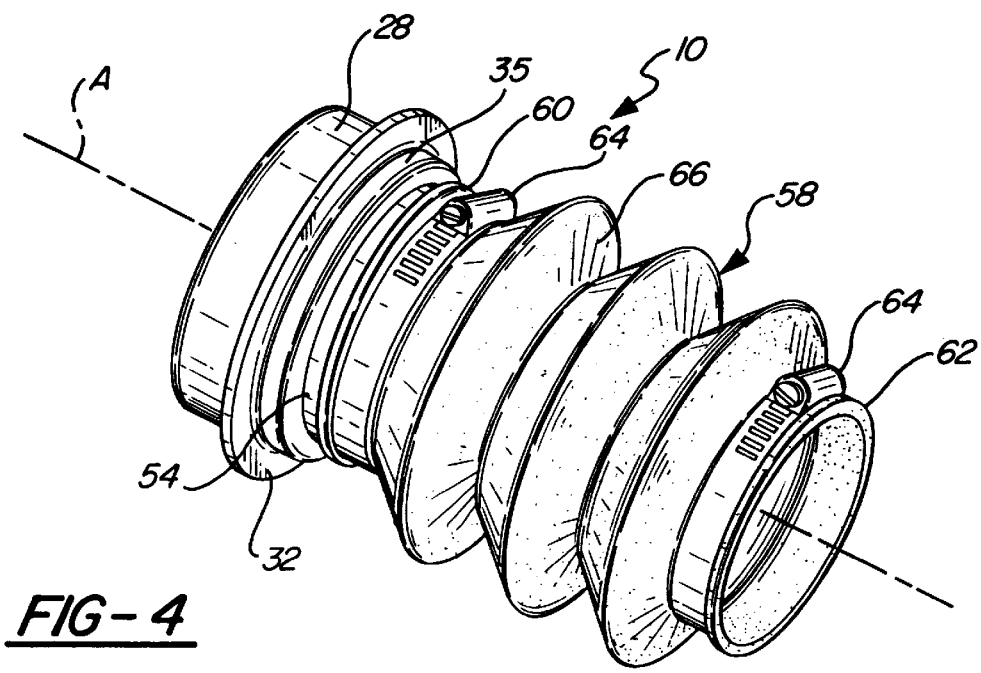
FIG. 4 is a perspective view of the unitized shaft seal assembly.

The seal assembly 10 prevents lubricating fluid loss from between the housing 14 and the shaft 16 while the shaft 16 rotates and the telescopic section 22 reciprocates back and forth. Referring primarily to FIGS. 2 and 3, the seal assembly 10 is shown comprising a generally rigid annular carrier body 28. Preferably, the carrier body 28 is formed as a stamping from a heavy gauge sheet steel to include a generally U-shaped frame 30 which is pressed into an appropriately dimensioned opening in the housing 14. A stop flange 32 projects radially outwardly from the exterior of the frame 30, whereas and a support flange 34 extends radially inwardly from the interior frame 30. A shield-like annular deflector 35 projects axially from the frame 30, and helps to exclude foreign matter from the seal interfaces.

A flexible annular sealing member, generally indicated at 36, is bonded, clamped, or otherwise supported concentrically on the support flange 34 of the carrier body 28. The sealing member 36 presents a radially inwardly facing primary sealing surface 38 which establishes the main barrier to lubricating fluid leakage from within the housing 14. In the preferred embodiment illustrated in the Figures, the primary sealing surface 38 is cantilevered in an axial direction from the support flange 34, and is backed by a coil spring 40. The sealing member 36 further includes an axially extending face sealing surface or lip 42.

The sealing member 36 also includes a rigid annular inner wear sleeve 44 having an annular shaft section 46. The shaft section 46 is pressed over a nut 48 or other feature of the main section 20 of the shaft 16. The shaft section 46 includes a retention flange 47 for permanently retaining the wear sleeve 44 in axial registry with the sealing member 36, i.e., to effectively lock the wear sleeve 44 in its operative position relative to the sealing member 36 and carrier body 28 thus creating a "unitized" seal. As best shown in FIG. 3, the exterior of the shaft section 46 establishes a precision running surface 50 in engagement with the primary sealing surface 38 of the sealing member 36. A face section 52 extends generally radially from the shaft section 46. The face sealing lip 42 of the sealing member 36 is maintained in compressed registry with the face section 52 of the wear sleeve 44 to exclude foreign matter. An annular mounting skirt 54 extends axially from the face section 52, such that its outer diameter is greater than the inner diameter of the shaft section 46. The mounting skirt 54 has a flared retention lip 56.

The seal assembly 10 includes a flexible elastomeric seal boot, generally indicated at 58, having a fixed end 60 and a protractile end 62 axially spaced and longitudinally relatively extensible from one another. The fixed end 60 includes an interior attachment surface disposed in surface-to-surface engagement about the mounting skirt 54 of the wear sleeve 44. In this position, the flared retention lip 56 of the mounting skirt 54 resists removal of the fixed end 60 of the boot 58. Similarly, the protractile end 62 includes an interior attachment surface for surface-to-surface (i.e., non-sliding) engagement about the telescopic section 22 of the shaft 16. Band clamps 64 encircle the respective ends 60, 62 of the boot 58 for applying a constricting force to prevent disassembly.

The boot 58 further includes an integral bellows section 66 composed of accordion-like annular pleats extending between the fixed 60 and protractile 62 ends. The bellows section 66 accommodates controlled extension and retraction of the boot 58 as the telescopic section 22 of the shaft 16 reciprocates during rotation. Therefore, as the shaft 16 rotates during operation, the bellows section 66 together with the wear sleeve 44 rotate relative to the sealing member 36 and the outer carrier body 28.

However, as the telescopic section 22 shifts axially due to loads imposed upon it during normal operation, the bellows section 66 expands and contracts, thereby protecting the spline connection 26, which may be packed with grease or the like. The boot 58 also protects the sealing member 36 from rapid wear by isolating it from axial forces as the telescopic section 22 reciprocates. Preferably, the boot 58 is fabricated from a silicone, nitrile, HNBR, or other suitable material.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A unitized seal assembly (10) for a rotary shaft (16) having a telescopic end (22), said seal assembly (10) comprising: a generally rigid annular carrier body (28); a flexible annular sealing member (36) fixed on said carrier body (28) and presenting a radially inwardly facing primary sealing surface (38); a generally rigid annular inner wear sleeve (44) rotatable relative to said carrier and having a running surface (50) engaging said primary sealing surface (38) of said sealing member (36); and characterized by a flexible seal boot (58) fixed at one end (60) to said wear sleeve (44) in unattached relation to said carrier body (28) and extending longitudinally therefrom to an opposite end (62) for mounting on the telescopic end (22) of the shaft (16).

2. An assembly (10) as set forth in claim 1 wherein said boot (58) includes an integral bellows section (66) between said ends (60, 62).

3. An assembly (10) as set forth in claim 1 wherein said wear sleeve (44) includes an annular mounting skirt (54), and said one end (60) of said boot (58) includes an interior attachment surface disposed in surface-to-surface engagement about said mounting skirt (54).

4. An assembly (10) as set forth in claim 3 wherein said wear sleeve (44) includes an annular shaft (46) section having an inner diameter, said mounting skirt (54) having an outer diameter greater than said inner diameter of said shaft (46) section.

5. An assembly (10) as set forth in claim 4 wherein said wear sleeve (44) includes a generally radially extending face section (52) joining said shaft (46) section and said mounting skirt (54).

6. An assembly (10) as set forth in claim 3 wherein said mounting skirt (54) includes a flared retention lip (56) for resisting removal of said fixed end (60) of said boot (58) therefrom.

7. An assembly (10) as set forth in claim 3 further including a band clamp (64) for applying a constricting force about one end (60) of said boot (58).

8. An assembly (10) as set forth in claim 1 wherein said opposite end (62) of said boot (58) includes an interior attachment surface for surface-to-surface engagement about the rotating shaft (16), and a band clamp (64) for applying a constricting force about said opposite end (62).

9. An assembly (10) as set forth in claim 1 wherein said inner wear sleeve (44) includes a retention flange (47) for permanently retaining said wear sleeve (44) in axial registry with said sealing member (36).

10. An assembly (10) as set forth in claim 1 wherein said sealing member (36) includes an axially extending face sealing surface (42) in compressed registry with a face section (52) of said wear sleeve (44).

11. A combination telescopic rotating shaft (16) and unitized seal assembly (10) therefor, said combination comprising: a housing (14); a shaft (16) having an axially fixed main section (20) rotatably supported in said housing (14) and a telescopic end (22) axially extendable relative to said main section (20) and said housing (14); a generally rigid annular carrier body (28) secured within said housing (14); a flexible annular sealing member (36) fixed on said carrier body (28) and presenting a radially inwardly facing primary annular sealing surface (38); a generally rigid annular inner wear sleeve (44) mounted on said axially fixed main section

(20) of said shaft (16) for rotation therewith relative to said carrier body (28) and said housing (14) and having a running surface (50) engaging said primary sealing surface (38) of said sealing member (36); and characterized by an elastomeric boot (58) having longitudinally spaced ends (60, 62), one of said ends (60) being fixed to said wear sleeve (44) and the opposite end (62) being fixed to said telescopic end (22) for rotation with said shaft (16) and extension with said telescopic end (22).

12. A combination as set forth in claim 11 wherein said boot (58) includes an integral bellows section (66) between said ends (60, 62).

13. A combination as set forth in claim 11 wherein said wear sleeve (44) includes an annular mounting skirt (54), and said one end (60) of said boot (58) includes an interior attachment surface disposed in surface-to-surface engagement about said mounting skirt (54).

14. A combination as set forth in claim 13 wherein said wear sleeve (44) includes an annular shaft (46) section having an inner diameter pressed over said main section (20) of said shaft (16), said mounting skirt (54) having an outer diameter greater than said inner diameter of said shaft (46) section.

15. A combination as set forth in claim 14 wherein said wear sleeve (44) includes a generally radially extending face section (52) joining said shaft (46) section and said mounting skirt (54).

16. A combination as set forth in claim 13 wherein said mounting skirt (54) includes a flared retention lip (56) for resisting removal of said one end (60) of said boot (58) therefrom.

17. A combination as set forth in claim 11 wherein said opposite end (62) of said boot (58) includes an interior attachment surface for surface-to-surface engagement about the rotating shaft (46).

18. A combination as set forth in claim 11 wherein said inner wear sleeve (44) includes a retention flange (47) for permanently retaining said wear sleeve (44) in axial registry with said sealing member (36).

19. A combination as set forth in claim 11 wherein said sealing member (36) includes an axially extending face sealing surface (42) in compressed registry with said face section (52) of said wear sleeve (44).

20. A unitized seal assembly (10) for a rotary shaft (16) having a telescopic end (22), said seal assembly (10) comprising: a generally rigid annular carrier body (28); a flexible annular sealing member (36) fixed to said carrier body (28) and presenting a radially inwardly facing primary annular sealing surface (38) and an axially extending face sealing surface (42); a generally rigid annular inner wear sleeve (44) having a shaft (46) section defining an outer running surface (50) engaging said primary sealing surface (38) of said sealing member (36), an annular mounting skirt (54), and a generally radially extending face section (52) between said shaft (46) section and said mounting skirt (54) engaging said face sealing surface (42) of said sealing member (36); and characterized by a flexible seal boot (58) extending longitudinally between opposite ends (60, 62) with one of said ends (60) being fixed to said mounting skirt (54) of said wear sleeve (44) and the opposite end (62) being coupled to the telescopic end (22) of the rotating shaft (16) for rotation therewith, and an integral bellows section (66) between said ends (60, 62).

\* \* \* \* \*